(12) United States Patent
Mosko et al.

(10) Patent No.: US 9,590,948 B2
(45) Date of Patent: Mar. 7, 2017

(54) CCN ROUTING USING HARDWARE-ASSISTED HASH TABLES

(71) Applicant: CISCO SYSTEMS, INC., San Jose, CA (US)

(72) Inventors: Marc E. Mosko, Santa Cruz, CA (US); Ignacio Solis, South San Francisco, CA (US)

(73) Assignee: CISCO SYSTEMS, INC., San Jose, CA (US)

( * ) Notice: Subject to any disclaimer, the term of this patent is extended or adjusted under 35 U.S.C. 154(b) by 103 days.

(21) Appl. No.: 14/570,144

(22) Filed: Dec. 15, 2014

(65) Prior Publication Data
US 2016/0173445 A1 Jun. 16, 2016

(51) Int. Cl.
*H04L 29/12* (2006.01)
*H04L 29/08* (2006.01)
(Continued)

(52) U.S. Cl.
CPC ........ *H04L 61/3005* (2013.01); *H04L 45/748* (2013.01); *H04L 61/1552* (2013.01);
(Continued)

(58) Field of Classification Search
CPC ............... H04L 45/7453; H04L 45/748; H04L 61/1552; H04L 61/3005; H04L 61/303; H04L 67/327; H04L 69/329
(Continued)

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Xie et al. "Collaborative Forwarding and Caching in Content Centric Networks", Networking 2012.
(Continued)

*Primary Examiner* — Mohammad Anwar
*Assistant Examiner* — Kokou R Detse
(74) *Attorney, Agent, or Firm* — Patent Capital Group

(57) ABSTRACT

One embodiment provides a system that facilitates forwarding of packets with variable length names. During operation, the system receives a packet with a hierarchically structured variable length identifier (HSVLI) which comprises contiguous name components ordered from a most general level to a most specific level. The system performs a longest prefix match lookup by selecting an entry from a first data structure of entries. The entries indicate a name component, forwarding information for the name component, and a plurality of entry identifiers that chain an entry to another entry. If a size of the name component is less than or equal to a predetermined threshold, the system selects an entry based on the name component. If the size is greater, the system selects an entry based on a compressed key which can be a hash of the name component. The system also resolves collisions associated with the selected entry.

24 Claims, 8 Drawing Sheets

(51) Int. Cl.
*H04L 12/745* (2013.01)
*H04L 12/743* (2013.01)

(52) U.S. Cl.
CPC .......... *H04L 61/303* (2013.01); *H04L 67/327* (2013.01); *H04L 69/329* (2013.01); *H04L 45/7453* (2013.01)

(58) Field of Classification Search
USPC ........................................................ 370/392
See application file for complete search history.

(56) References Cited

U.S. PATENT DOCUMENTS

| | | | |
|---|---|---|---|
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |
| 5,506,844 | A | 4/1996 | Rao |
| 5,629,370 | A | 5/1997 | Freidzon |
| 5,845,207 | A | 12/1998 | Amin |
| 5,870,605 | A | 2/1999 | Bracho |
| 6,047,331 | A | 4/2000 | Medard |
| 6,052,683 | A | 4/2000 | Irwin |
| 6,085,320 | A | 7/2000 | Kaliski, Jr. |
| 6,091,724 | A | 7/2000 | Chandra |
| 6,128,623 | A | 10/2000 | Mattis |
| 6,128,627 | A | 10/2000 | Mattis |
| 6,173,364 | B1 | 1/2001 | Zenchelsky |
| 6,209,003 | B1 | 3/2001 | Mattis |
| 6,226,618 | B1 | 5/2001 | Downs |
| 6,233,617 | B1 | 5/2001 | Rothwein |
| 6,233,646 | B1 | 5/2001 | Hahm |
| 6,289,358 | B1 | 9/2001 | Mattis |
| 6,292,880 | B1 | 9/2001 | Mattis |
| 6,332,158 | B1 | 12/2001 | Risley |
| 6,363,067 | B1 | 3/2002 | Chung |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,732,273 | B1 | 5/2004 | Byers |
| 6,769,066 | B1 | 7/2004 | Botros |
| 6,772,333 | B1 | 8/2004 | Brendel |
| 6,775,258 | B1 | 8/2004 | vanValkenburg |
| 6,862,280 | B1 | 3/2005 | Bertagna |
| 6,901,452 | B1 | 5/2005 | Bertagna |
| 6,915,307 | B1 | 7/2005 | Mattis |
| 6,917,985 | B2 | 7/2005 | Madruga |
| 6,957,228 | B1 | 10/2005 | Graser |
| 6,968,393 | B1 | 11/2005 | Chen |
| 6,981,029 | B1 | 12/2005 | Menditto |
| 7,007,024 | B2 | 2/2006 | Zelenka |
| 7,013,389 | B1 | 3/2006 | Srivastava |
| 7,031,308 | B2 | 4/2006 | Garcia-Luna-Aceves |
| 7,043,637 | B2 | 5/2006 | Bolosky |
| 7,061,877 | B1 | 6/2006 | Gummalla |
| 7,080,073 | B1 | 7/2006 | Jiang |
| RE39,360 | E | 10/2006 | Aziz |
| 7,149,750 | B2 | 12/2006 | Chadwick |
| 7,152,094 | B1 | 12/2006 | Jannu |
| 7,177,646 | B2 | 2/2007 | ONeill |
| 7,206,860 | B2 | 4/2007 | Murakami |
| 7,206,861 | B1 | 4/2007 | Callon |
| 7,210,326 | B2 | 5/2007 | Kawamoto |
| 7,246,159 | B2 | 7/2007 | Aggarwal |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,362,727 | B1 | 4/2008 | ONeill |
| 7,382,787 | B1 | 6/2008 | Barnes |
| 7,395,507 | B2 | 7/2008 | Robarts |
| 7,430,755 | B1 | 9/2008 | Hughes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,542,471 | B2 | 6/2009 | Samuels |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,564,812 | B1 | 7/2009 | Elliott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,636,767 | B2 | 12/2009 | Lev-Ran |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,698,559 | B1 | 4/2010 | Chaudhury |
| 7,769,887 | B1 | 8/2010 | Bhattacharyya |
| 7,779,467 | B2 | 8/2010 | Choi |
| 7,801,069 | B2 | 9/2010 | Cheung |
| 7,801,177 | B2 | 9/2010 | Luss |
| 7,816,441 | B2 | 10/2010 | Elizalde |
| 7,831,733 | B2 | 11/2010 | Sultan |
| 7,873,619 | B1 | 1/2011 | Faibish |
| 7,908,337 | B2 | 3/2011 | Garcia-Luna-Aceves |
| 7,924,837 | B1 | 4/2011 | Shabtay |
| 7,953,014 | B2 | 5/2011 | Toda |
| 7,953,885 | B1 | 5/2011 | Devireddy |
| 7,979,912 | B1 | 7/2011 | Roka |
| 8,000,267 | B2 | 8/2011 | Solis |
| 8,010,691 | B2 | 8/2011 | Kollmansberger |
| 8,069,023 | B1 | 11/2011 | Frailong |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,271,578 | B2 | 9/2012 | Sheffi |
| 8,271,687 | B2 | 9/2012 | Turner |
| 8,312,064 | B1 | 11/2012 | Gauvin |
| 8,332,357 | B1 | 12/2012 | Chung |
| 8,386,622 | B2 | 2/2013 | Jacobson |
| 8,447,851 | B1 | 5/2013 | Anderson |
| 8,462,781 | B2 | 6/2013 | McGhee |
| 8,467,297 | B2 | 6/2013 | Liu |
| 8,473,633 | B2 | 6/2013 | Eardley |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,677,451 | B1 | 3/2014 | Bhimaraju |
| 8,688,619 | B1 | 4/2014 | Ezick |
| 8,699,350 | B1 | 4/2014 | Kumar |
| 8,718,055 | B2 | 5/2014 | Vasseur |
| 8,750,820 | B2 | 6/2014 | Allan |
| 8,761,022 | B2 | 6/2014 | Chiabaut |
| 8,762,477 | B2 | 6/2014 | Xie |
| 8,762,570 | B2 | 6/2014 | Qian |
| 8,762,707 | B2 | 6/2014 | Killian |
| 8,767,627 | B2 | 7/2014 | Ezure |
| 8,817,594 | B2 | 8/2014 | Gero |
| 8,826,381 | B2 | 9/2014 | Kim |
| 8,832,302 | B1 | 9/2014 | Bradford |
| 8,836,536 | B2 | 9/2014 | Marwah |
| 8,861,356 | B2 | 10/2014 | Kozat |
| 8,862,774 | B2 | 10/2014 | Vasseur |
| 8,868,779 | B2 | 10/2014 | ONeill |
| 8,874,842 | B1 | 10/2014 | Kimmel |
| 8,880,682 | B2 | 11/2014 | Bishop |

(56) References Cited

U.S. PATENT DOCUMENTS

| | | |
|---|---|---|
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |

(56) References Cited

U.S. PATENT DOCUMENTS

| | | |
|---|---|---|
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1* | 4/2011 | Jacobson ............... H04L 45/745 370/392 |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |

(56) References Cited

U.S. PATENT DOCUMENTS

| | | |
|---|---|---|
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |

(56) References Cited

FOREIGN PATENT DOCUMENTS

| WO | 03049369 | A2 | 6/2003 |
|---|---|---|---|
| WO | 03091297 | A1 | 11/2003 |
| WO | 2007113180 | A1 | 10/2007 |
| WO | 2007122620 | | 11/2007 |
| WO | 2007144388 | A1 | 12/2007 |
| WO | 2011049890 | A1 | 4/2011 |
| WO | 2012077073 | A1 | 6/2012 |
| WO | 2013123410 | | 8/2013 |
| WO | 2015084327 | | 6/2015 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boner, C. Gentry, and B. Waters, Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.

(56) References Cited

OTHER PUBLICATIONS

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop o Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

H. Xiong, X. Zhang, W. Zhu, and D. Yao. CloudSeal: End-to$2.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hogue et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer Sciencevol. 5443 (2009).

V. Jacobson et al., 'Networking Named Content,' Proc. IEEE CoNEXT '09, Dec. 2009.

Jacobson, Van et al. 'VoCCN: Voice Over Content-Centric Networks.' Dec. 1, 2009. ACM ReArch'09.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Blaze, G. Bleumer, and M. Strauss, 'Divertible protocols and atomic prosy cryptography,' in Proc. Eurocrypt 1998, Espoo, Finland, May-Jun. 1998, pp. 127-144.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matted Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE-A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

Rosenberg, J. "Interactive Connectivity Establishment (ICE): A Protocol for Network Address Translator (NAT) Traversal for Offer/Answer Protocols", Apr. 2010, pp. 1-117.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

(56) References Cited

OTHER PUBLICATIONS

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Sandvine, Global Internet Phenomena Report—Spring 2012. Located online at http://www.sandvine.com/downloads/ documents/Phenomenal H 2012/Sandvine Global Internet Phenomena Report 1H 2012.pdf.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shih, Eugene et al., 'Wake on Wireless: An Event Driven Energy Saving Strategy for Battery Operated Devices', Sep. 23, 2002, pp. 160-171.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

The Despotify Project (2012). Available online at http://despotify.sourceforge.net/.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

V. K. Adhikari, S. Jain, Y. Chen, and Z.-L. Zhang. Vivisecting Youtube:An Active Measurement Study. In INFOCOM12 Mini-conference (2012).

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014}: 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

J. Lotspiech, S. Nusser, and F. Pestoni. Anonymous Trust: Digital Rights Management using Broadcast Encryption. Proceedings of the IEEE 92.6 (2004).

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010).

(56) References Cited

OTHER PUBLICATIONS

RTMP (2009). Available online at http://wwwimages.adobe.com/www.adobe.com/content/dam/Adobe/en/devnet/rtmp/pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
J. Aumasson and D. Bernstein, "SipHash: a fast short-input PRF", Sep. 18, 2012.
A. Broder and A. Karlin, "Multilevel Adaptive Hashing", Jan. 1990, pp. 43-53.
S. Kumar et al. "Peacock Hashing: Deterministic and Updatable Hashing for High Performance Networking," 2008, pp. 556-564.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011, pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones" International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* * figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]—[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.

* cited by examiner

CCN ROUTING USING HARDWARE-ASSISTED HASH TABLES

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. Pat. No. 8,243,735 (U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, issued 14 Aug. 2012 (hereinafter "U.S. Pat. No. 8,243,735");

the disclosures of which are herein incorporated by reference in their entirety.

BACKGROUND

Field

This disclosure is generally related to distribution of digital content. More specifically, this disclosure is related to forwarding packets in a content centric network (CCN) by using hardware-assisted hash tables in a CCN router.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level, and can contain an arbitrary number of path segments (e.g., name components) of unbounded and variable length.

In general, a CCN router maintains a forwarding table to determine how to forward a packet. The forwarding table can be a hash table where the key is based on a name component and the result contains the forwarding information for the name component. Network processors in a CCN router can increase the efficiency and speed of forwarding by providing hardware-assisted hash tables. These hardware-assisted hash tables typically restrict the key length and the result length to a fixed size. This restriction imposes limits on using these hardware-assisted hash tables for forwarding packets in a CCN, where forwarding is performed based on name components of unbounded and variable length which may be greater than the fixed length supported by the hardware-assisted hash tables.

SUMMARY

One embodiment provides a system that facilitates forwarding of packets with variable length names. During operation, the system receives a packet with a hierarchically structured variable length identifier (HSVLI) which comprises contiguous name components ordered from a most general level to a most specific level. The system performs a longest prefix match lookup by selecting an entry from a first data structure of entries. The entries indicate a name component, forwarding information for the name component, and a plurality of entry identifiers that chain an entry to another entry. Each name component has a size. If the size of a name component is less than or equal to a predetermined threshold, the system selects an entry based on the name component. If the size is greater, the system compresses the name component to obtain a compressed key, and selects an entry based on the compressed key. In response to determining a lookup collision associated with the selected entry, the system resolves the lookup collision, thereby facilitating forwarding of packets with variable length names.

In some embodiments, in response to determining that the size of the name component is less than or equal to the predetermined threshold, the system creates an entry in the first data structure based on the name component. In response to determining that the size of the name component is greater than the predetermined threshold, the system performs a first compression function on the name component to obtain a compressed key and creates an entry in the first data structure based on the compressed key. In response to determining an insertion collision based on the created entry, the system resolves the insertion collision.

In some embodiments, the system creates an entry in a second data structure based on the name component, wherein the second data structure indicates the name component and a corresponding index. The system sets a string identifier field in the entry for the name component in the first data structure to the index from the second data structure.

In some embodiments, the system resolves the insertion collision by including a collision indicator in the created entry in the first data structure. The system performs a second compression function on the name component to obtain a new lookup key. The system also creates an entry in a third data structure based on the new lookup key, wherein the third data structure indicates the new lookup key and forwarding information for the name component.

In some embodiments, the system resolves the lookup collision by determining that the selected entry includes the collision indicator. The system performs the second compression function on the name component to obtain the new lookup key, and selects an entry in the third data structure based on the new lookup key.

In some embodiments, in response to selecting the entry in the first data structure based on the compressed key, the system determines the index of the string identifier field for the selected entry and retrieves, from the second data structure, the name component based on the determined index. The system compares the name component of the HSVLI with the retrieved name component from the second data structure.

In some embodiments, the plurality of entry identifiers includes a parent identifier and an entry identifier, wherein the entry identifier is unique for each entry in the first data structure. For each name component, beginning with a component at the most general level, the system selects the entry based on the parent identifier, wherein: for the most general level name component, the parent identifier of the entry corresponds to a predetermined initial value; and for each subsequent name component, the parent identifier of the entry corresponds to the entry identifier of an entry corresponding to the name component of a previous most general level.

In some embodiments, the first data structure is a hash table of entries comprised of a key and a result, wherein: if the size is less than or equal to the predetermined threshold, the key is based on the name component directly; and if the size is greater than the predetermined threshold, the key is based on the compressed key.

DETAILED DESCRIPTION

Figure 1:
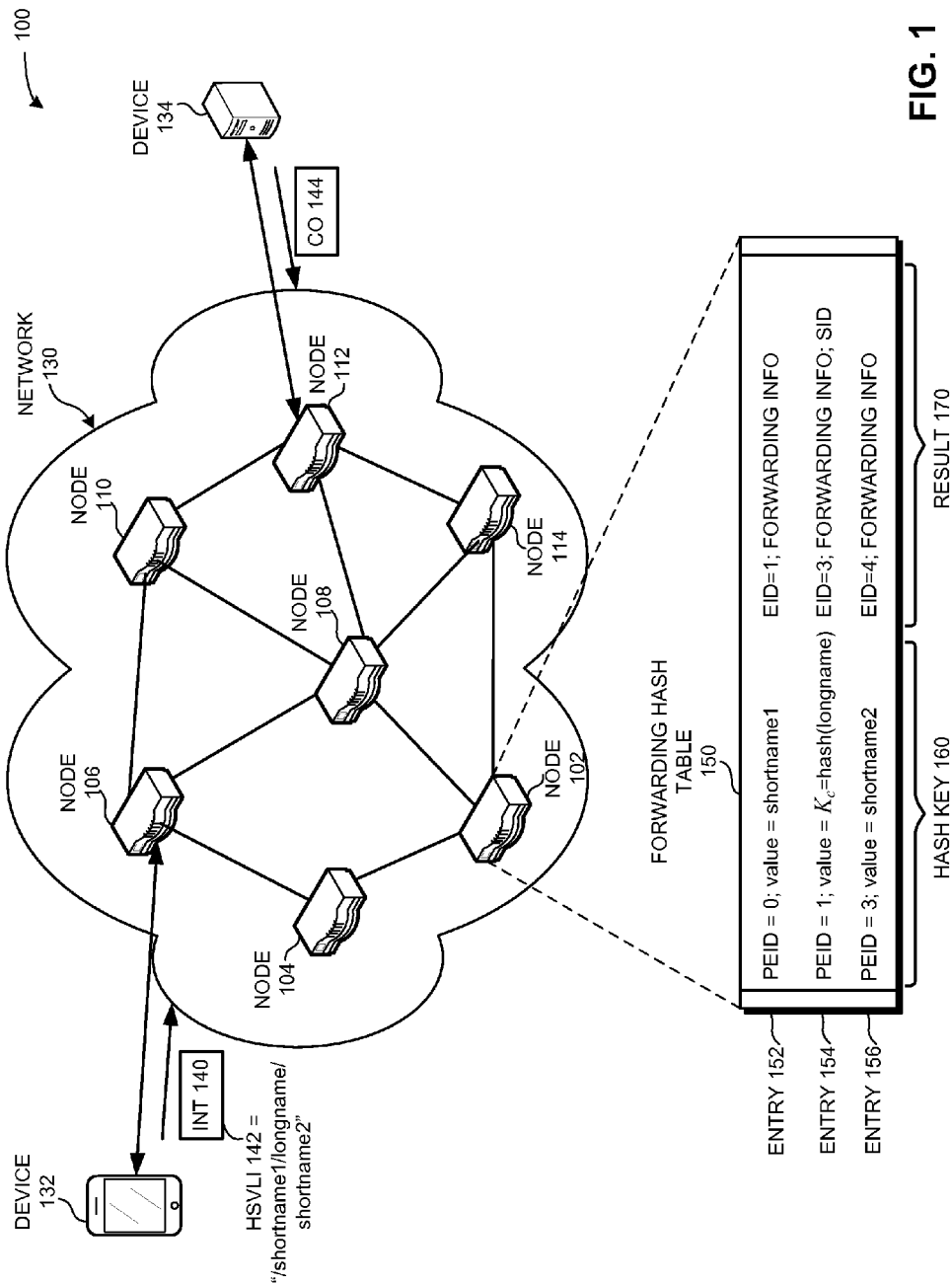
FIG. 1 illustrates an exemplary computing environment that facilitates forwarding of packets with variable length names using hardware-assisted hash tables, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that solves the problem of using hardware-assisted hash tables (which are typically restricted to fixed length keys) to forward CCN packets by mapping name components to a forwarding hash table and performing chained hash lookups in the forwarding hash table. Forwarding a CCN packet is typically based on a name associated with the packet, which can be a hierarchically structured variable length identifier (HSVLI) that includes contiguous name components ordered from a most general level to a most specific level. The present system can map the name components of an HSVLI for insertion and lookup in the forwarding hash table of a CCN router based on the size of each name component. When the size of the name component is small (e.g., less than or equal to 41 bytes), the system creates a hash table entry using a standard hash table function, where the key is the name component. When the size is big (e.g., greater than 41 bytes), the system creates the entry by first applying a compression function on the name component, and using the compressed value as the key for the hash table. The system can also insert the uncompressed name component into a separate string table at a specific index, and indicate that index in the result of the entry. If a collision occurs during insertion, the system can set a flag in the result to indicate a collision, generate a new lookup key, and create an entry in a separate table using the new lookup key.

Furthermore, the system uses the forwarding hash table to perform chained hash lookups, which determines the forwarding information for a packet. During the insertion process, the system assigns a unique index key (e.g., an entry identifier (EID)) to each result in the forwarding hash table. Each entry includes its own unique index key and also includes a pointer to the unique index key of the previous name component (e.g., a parent entry identifier (PEID)). Another method of using the forwarding hash table in a CCN router is cumulative name component hashing, described in U.S. Pat. No. 8,243,735, herein incorporated by reference.

To forward the packet, the system parses through each name component of an HSVLI, from the most general level to the most specific level, using the unique index keys of each entry result to chain the lookups in the forwarding hash table for each name component. Similar to the insertion process, the system looks up a name component by using the name directly if the size is less than or equal to a certain size, and by using the compressed key if the size is greater. If a collision occurs during lookup, the system can use the index included in the result of the entry to obtain the original uncompressed key from the separate string table, and compare the uncompressed key with the name component of the HSVLI from the packet. Furthermore, the system can detect that the result flag in the entry indicates a collision, generate a new lookup key, and perform a lookup in a separate table using the new lookup key. The result returned from the chained hash lookups, referred to as the "longest prefix match lookup," is used to forward the packet. In this disclosure, longest prefix match lookup refers to performing a lookup that returns a result matching the largest number of components, from the most general level to the most specific level, in an HSVLI. Thus, by mapping the name components in a size-based manner to the forwarding hash table (e.g., the hardware-assisted hash table maintained by a CCN router), and by chaining the hash lookups with unique index keys, the system can use hardware-assisted hash tables in a CCN router to increase the efficiency of forwarding packets.

In examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. An example of a CCN architecture is described in U.S. patent application Ser. No. 12/338,175.

Network Architecture and Overview of Forwarding Using Hardware-Assisted Hash Tables FIG. 1 illustrates an exemplary computing environment 100 that facilitates forwarding of packets with variable length names based on hardware-assisted hash tables, in accordance with an embodiment of the present invention. Computing environment 100 can include a device 132, which can include any content consuming device that can determine a request for content via network 130. Computing environment 100 can also include a device 134, which can include any content consuming device that can determine a request for content via network 130. Computing environment 100 can include a network 130, which can include nodes 102, 104, 106, 108, 110, 112, and 114. Network 130 can be a content centric network (CCN), and each of nodes 102-114 can be a CCN forwarder or router that contains a network processor with the hardware-assisted hash tables described in this disclosure. A user of device 132 can generate an interest packet 140 with an HSVLI 142 of "/shortname1/longname/shortname2" for a piece of content, which is received by a content producer at device 134. Device 134 can return a content object 144 fulfilling interest 140, along a reverse path as interest 140. Interest 140 and content object 144 may pass through various intermediate routers in network 130, including a CCN router at node 102 ("CCN router 102"). CCN router 102 maintains a forwarding hash table 150 which uses specific hardware included in the processor of router 102.

Forwarding hash table 150 can include forwarding information for HSVLI 142 of "shortname1/longname/shortname2" by listing entries with a hash key 160 and a result 170. Forwarding hash table 150 can contain entries 152, 154, and 156. For short name components (e.g., less than or equal to 41 bytes), CCN router 102 can use the name component directly in the hash key, as in entry 152 with a value of "shortname1," and in entry 156 with a value of "shortname2 ." For long name components (e.g., greater than 41 bytes), CCN router 102 can first compress the name component by performing a compression function on the name component to obtain a compressed key, $K_c$, and use that compressed key $K_c$ in the hash key, as in entry 154 with a value of "hash(longname)." The compression function can be based on a hash function, a dictionary method, or any other known method. Entry 154 can also include a string identifier (SID) field that indicates the index to an entry in separate string table that stores the original, uncompressed "longname" string. CCN router 102 detects and handles insertion and lookup collisions as described in relation to FIGS. 2, 3A, and 3B. In some embodiments, forwarding hash table 150 includes one table for short name components (e.g., entries 152 and 156) that does not include an SID and another table for long name components (e.g., entry 154) that does include an SID. Compressed and uncompressed keys can be stored in different tables, e.g., corresponding to the data structures shown in FIGS. 4A-4C for uncompressed keys and FIG. 4D for compressed keys. Entries in forwarding hash table 150 can also include a bit in the key to indicate whether the key is compressed or uncompressed.

Furthermore, CCN router 102 forwards packet 140 by performing chained hash lookups in forwarding hash table 150 to determine the longest prefix match for HSVLI 142. CCN router 102 computes the key for the first name component ("shortname1"). Because the first name component is no longer than a threshold, it uses an uncompressed key $K_1$ equal to a PEID concatenated with the literal name component (e.g., hash key 160 of entry 152). The system looks up $K_1$ in the uncompressed key hash table. The hardware-assisted hash table will then produce the corresponding result. If a match is found based on $K_1$, the results will contain an EID and corresponding forwarding information for the name (e.g., result 170 of entry 152). The system then proceeds to look up the next name component ("long-name"). Because this name component is longer than a threshold, it computes a compressed key $K_2$ equal to a PEID concatenated with a hash of the name component (e.g., hash key 160 of entry 154). In this case, the PEID is the EID returned from $K_1$. The system looks up $K_2$ in the compressed key hash table. The hardware-assisted hash table will then produce the corresponding result. If a match is found based on $K_2$, the results will contain an EID and corresponding forwarding information for the name (e.g., result 170 of entry 154). The EID can be a small number, efficiently and uniquely compressing the previous key. The system continues these chained hash lookups for each subsequent name component, and the result returned from the most specific level name component ("shortname2") is the longest prefix match (e.g., forwarding information of result 170 for entry 156).

Inserting Entries Using Hardware-Assisted Hash Table

Figure 2:
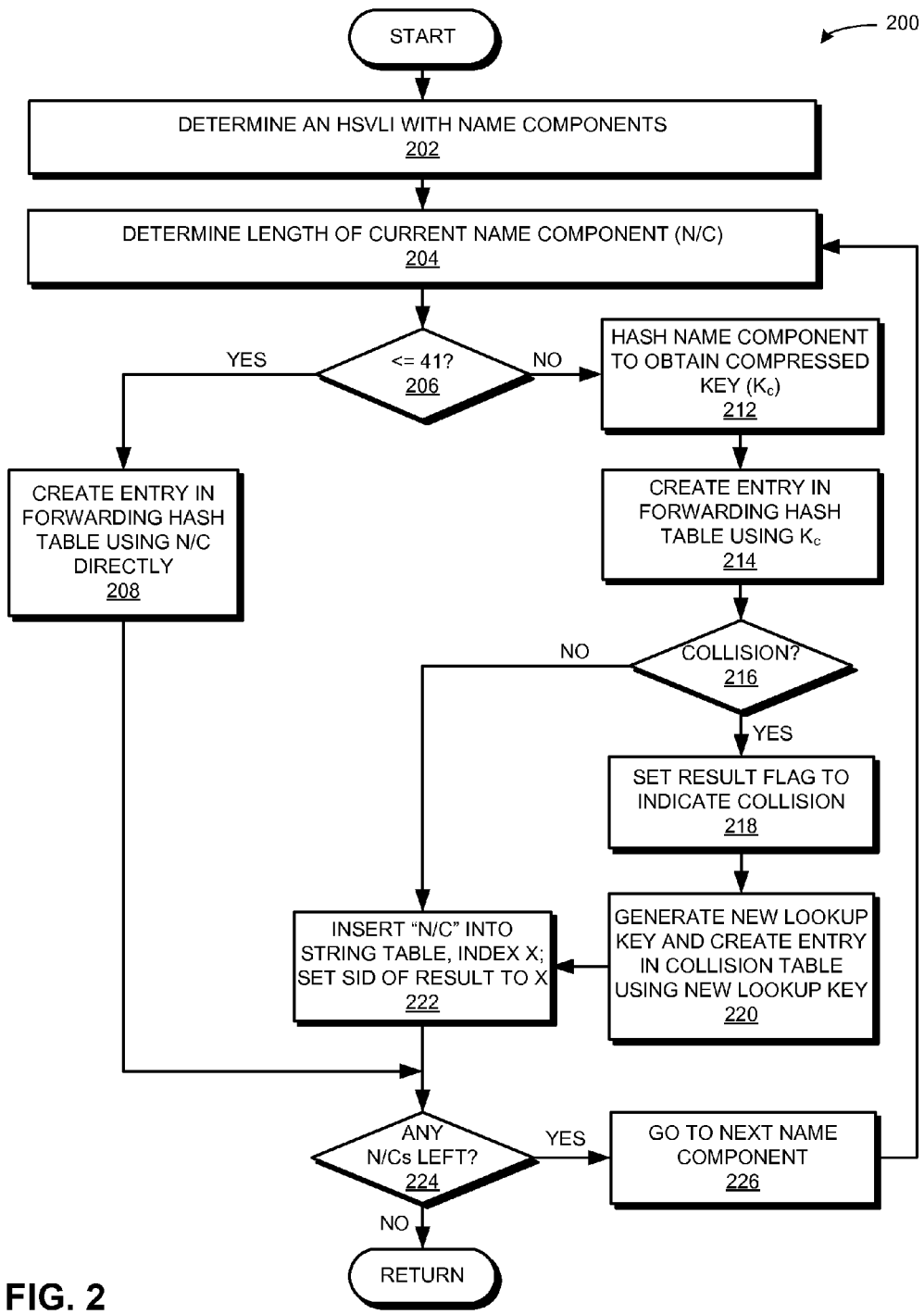
FIG. 2 presents a flow chart illustrating a method for inserting entries into a forwarding table based on a hardware-assisted hash table, in accordance with an embodiment of the present invention.

FIG. 2 presents a flow chart illustrating a method 200 for inserting entries into a forwarding table based on a hardware-assisted hash table, in accordance with an embodiment of the present invention. During operation, the system determines a packet with an HSVLI (operation 202). The system parses through the HSVLI in order (e.g., by each name component from the most general level to the most specific level). The system determines the length of the current name component (operation 204). If the length is less than or equal to a predetermined size (e.g., 41 bytes) (decision 206), the system creates an entry in the hash table using the name component directly (e.g., the original, uncompressed string) (operation 208). The key for the entry can be the Parent Entry Identifier (PEID) concatenated with the hash of the name component, while the result for the entry can include the unique Entry Identifier (EID) assigned by the control plane. For each name component, the PEID is set to an initial value of "0" and is updated during the lookup process such that the PEID is set to the EID of the lookup from the previous name component, as described below in relation to FIG. 3A. The system then determines if any name components remain to be processed (decision 224). If there are no name components left, the operation returns. If more name components remain to be processed, the system moves to the next name component (operation 226), and returns to operation 204 to begin the insertion process for the next name component.

If the length is less than or equal to a predetermined size (e.g., 41 bytes) (decision 206), the system compresses the name component by, e.g., hashing the name component, to obtain a compressed key ($K_c$) (operation 212). The system creates an entry in the hash table using the compressed key, $K_c$ (operation 214). If the system does not detect a collision upon inserting the entry based on the compressed key (decision 216), the system inserts the original, uncompressed string into a string table at a specific index, and includes a string identifier (SID) in the result of the entry in the forwarding table with a value set to the specific index value (operation 222). The SID is a pointer to a table storing the uncompressed key value. If the system does detect a collision upon inserting the entry based on the compressed key (decision 216), the system sets a result flag in the entry to indicate a collision (operation 218). The system then generates a new lookup key and creates an entry in a collision table using the new lookup key (operation 220). The system performs operation 222, as described above. Subsequently, the system determines whether any name components remain to be processed (decision 224), and if any name components do remain to be processed, moves to the next name component (operation 226) to begin the insertion process for the next name component (operation 204).

Looking Up Entries Using Hardware-Assisted Hash Table

Figure 3A:
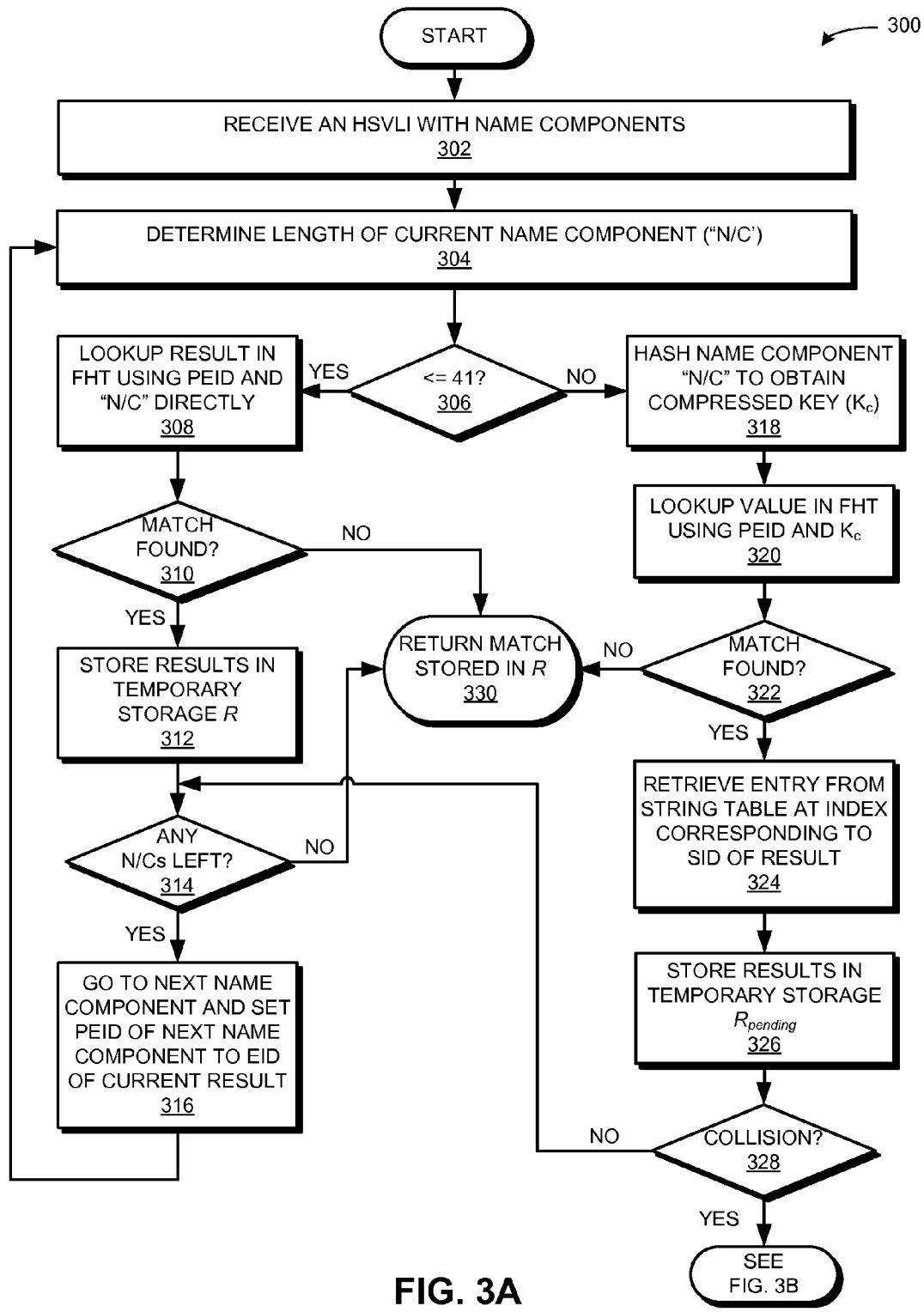
FIG. 3A presents a flow chart illustrating a method for looking up entries in a forwarding table based on a hardware-assisted hash table, in accordance with an embodiment of the present invention.

FIG. 3A presents a flow chart illustrating a method 300 for looking up entries in a forwarding table based on a hardware-assisted hash table, in accordance with an embodiment of the present invention. During operation, the system receives a packet with an HSVLI (operation 302). The system parses through the HSVLI in order (e.g., by processing each name component from the most general level to the most specific level), obtaining lookup entry results for each name component, and storing each matched result. The matched result for the most specific level name component is the longest prefix match and contains forwarding information for the packet. The longest match, in terms of the number of name components, is considered the best because it is the most specific. The system determines the length of the current name component (operation 304). If the length is less than or equal to a predetermined size (e.g., 41 bytes) (decision 306), the system looks up the value in the forwarding table using a key based on the PEID and the name component directly as a string (operation 308). If a match is not found, the system returns the match that is currently stored in temporary storage R (operation 330). If a match is found, the system stores the matched result in temporary storage R (operation 312). The matched result contains the unique EID that is used to chain the hash table lookups, as described above. The system determines if any name components remain to be processed (decision 314). If there are no name components left, the system returns the match that is currently stored in temporary storage R (operation 330). If more name components remain to be processed (decision 314), the system goes to the next name component and sets the PEID of the next name component to the EID of the current result (operation 316). Subsequently, the system returns to operation 304 to begin the lookup process for the next name component.

If the length is greater than a predetermined size (e.g., 41 bytes) (decision 306), the system compresses the name component by, e.g., hashing the name component, to obtain a compressed key ($K_c$) (operation 318). The system looks up the value in the forwarding table using a key based on the PEID and the compressed key, $K_c$ (operation 320). If a match is not found, the system returns the match that is currently stored in temporary storage R (operation 330). If a match is found, the system determines a string identifier (e.g., index value) for the result and retrieves the entry from the string table corresponding to the index value of the string identifier (SID) (operation 324). As described above, the SID is a pointer to a table storing the uncompressed key value. The system stores the matched result in temporary storage R (operation 326). The matched result contains the unique EID that is used to chain the hash table lookups, as described above. The system determines if a collision is detected in the lookup based on the compressed key (decision 328). If a collision is detected in the lookup based on the compressed key, the operation continues as described in FIG. 3B. If no collision is detected, the system determines if any name components remain to be processed (decision 314). If there are no name components left, the system returns the match that is currently stored in temporary storage R (operation 330). If more name components remain to be processed, the system goes to the next name component and sets the PEID of the next name component to the EID of the current result (operation 316). Subsequently, the system returns to operation 304 to begin the lookup process for the next name component.

Resolving Collisions Using Hardware-Assisted Hash Table

Figure 3B:
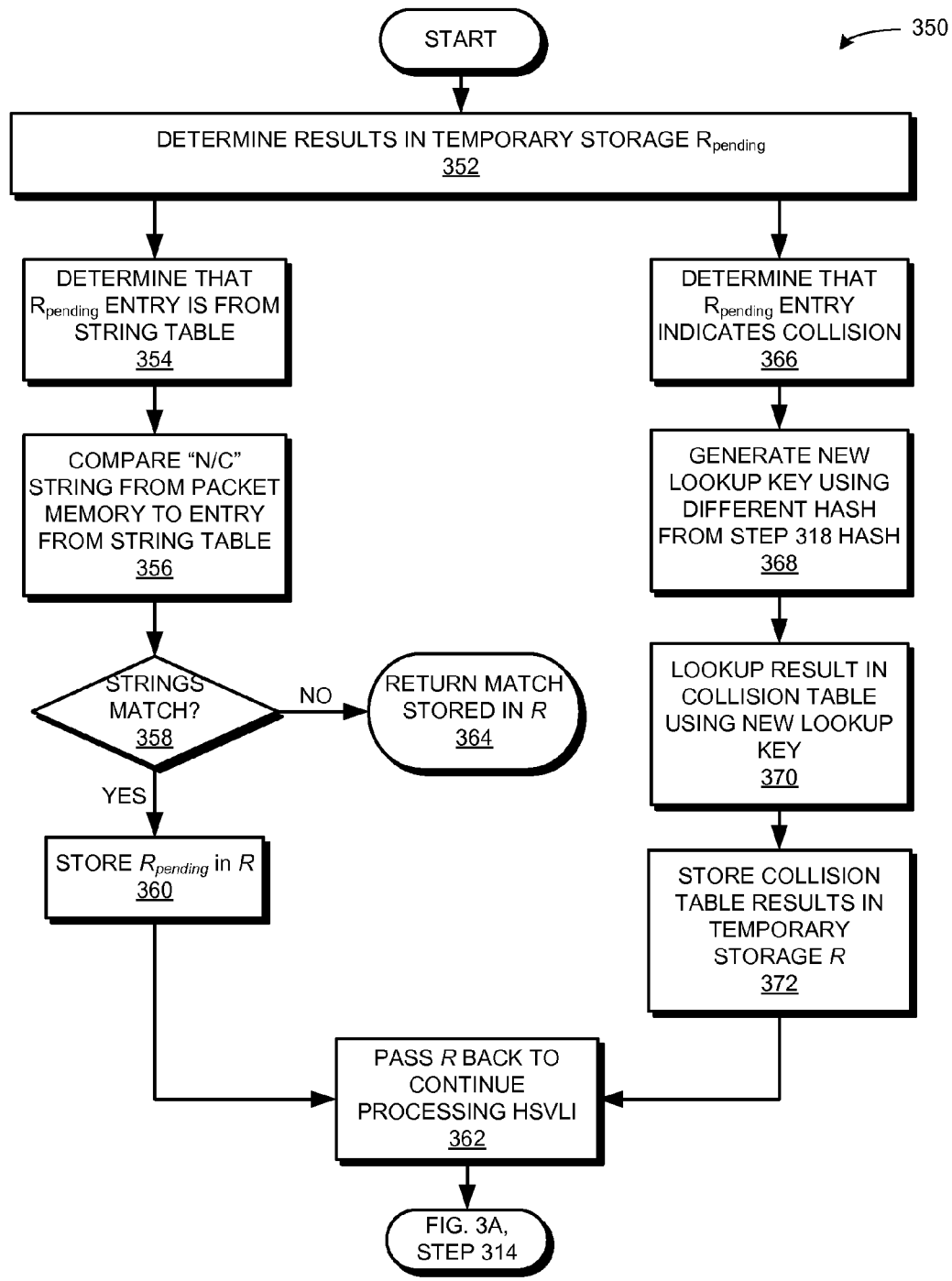
FIG. 3B presents a flow chart illustrating a method for resolving lookup collisions encountered in a forwarding table based on a hardware-assisted hash table, in accordance with an embodiment of the present invention.

FIG. 3B presents a flow chart illustrating a method 350 for resolving lookup collisions encountered in a forwarding table based on a hardware-assisted hash table, in accordance with an embodiment of the present invention. During operation, the system determines temporary storage results $R_{pending}$ (operation 352), which contain the most recent lookup entry from the process depicted and described in relation to FIG. 3A. The system can determine that the entry originates from a string table (operation 354). The system compares the name component string from the packet memory of the interest to the entry from the string table (operation 356). As discussed above, the string table entry is located based on the SID included in the result, where the SID is a pointer to a table storing the uncompressed key value. If the strings do not match (indicating that the hash entries do not match) (decision 358), the system returns the match stored in R (which contains the forwarding information for the previous name component as determined by the operations in FIG. 3A). If the strings do match (decision 358), the system stores the results from $R_{pending}$ in R (operation 360), and passes R back to continue processing the HSVLI (operation 362), which continues in operation 314 of FIG. 3A.

The system can also determine that the entry in $R_{pending}$ indicates a collision, based on a flag in the result indicating a collision (operation 366). The system generates a new lookup key (operation 368) by applying a hash function that is both different from the hash function applied to obtain the compressed key (of operation 318 in FIG. 3A) and the same as the hash function applied to generate the new lookup key upon insertion (as in operation 220 of FIG. 2). The system looks up the result in the collision table using the new lookup key (operation 370) and stores the collision table results in temporary storage R (operation 376). Subsequently, the system passes R back to operation 314 of FIG. 3A to continue processing the HSVLI (operation 362).

Exemplary Formats of Hardware-Assisted Hash Tables

Figure 4A:
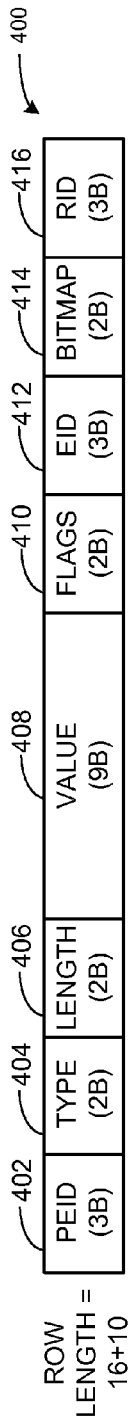
FIG. 4A presents a table depicting a format of a hash table data structure with keys that include a value with a size up to 9 bytes, in accordance with an embodiment of the present invention.

FIG. 4A presents a table depicting a format of a hash table data structure 400 with keys that include a value with a size up to 9 bytes, in accordance with an embodiment of the present invention. Data structure 400 represents an entry in the forwarding hash table and includes a hash key 420 and a result 422 for the entry. Hash key 420 can include a 3-byte Parent Entry Identifier (PEID) field 402, a 2-byte type field 404, a 2-byte length field 406, and a 9-byte value field 408. PEID 402 contains an identifier which is set to an initial value (e.g., 0) and is subsequently updated with a unique entry identifier from a parent name component during a lookup. Result 422 can include a 2-byte flags field 410, a 3-byte entry identifier (EID) field 412, and the forwarding entry which can include a 2-byte slot bitmap field 414 and a 3-byte route identifier (RID) field 416. Flags 410 can include a set of flags specific to the network processor (e.g., the EZChip NP4 Network Processor, herein after "NP4") and can indicate a collision in the forwarding hash table. EID 412 is a unique identifier assigned by the control plane. During operation, the system can chain lookups in the forwarding hash table by updating the PEID of a lookup after the initial lookup with the value of the EID from the previous lookup, as described in relation to FIGS. 2 and 3A. The forwarding entry (slot bitmap 414 and RID 416) allow multicast forwarding for an interest. For example, slot bitmap 414 can indicate the egress NP4 identity. Each line card can have two NP4 network processors. As a result, slot bitmap 414 indicates the egress NP4 rather than the line card. RID 416 is a unique identifier created by the control software to indicate the egress ports on each line card. The control software can create an array entry on each egress NP4 that is indexed by the RID and indicates the exact ports through which to send the interest. In some embodiments, multiple routes can share the same egress set and use the same RID, while in other embodiments, one RID is assigned for each route. Data structure 400 has a row length of 26, which includes 16 bytes for hash key 420 and 10 bytes for result 422.

Figure 4B:
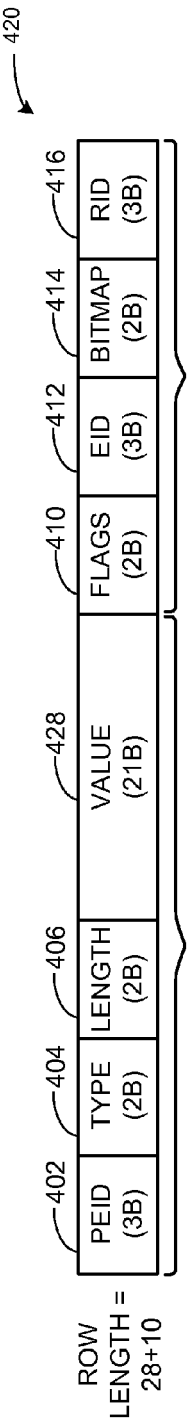
FIG. 4B presents a table depicting a format of a hash table data structure with keys that include a value with a size up to 21 bytes, in accordance with an embodiment of the present invention.

FIG. 4B presents a table depicting a format of a hash table data structure 420 with keys that include a value with a size up to 21 bytes, in accordance with an embodiment of the present invention. Data structure 420 represents an entry in the forwarding hash table and includes a hash key 430 and a result 432 for the entry. Data structure 420 contains fields similar to data structure 400 (e.g., hash key 430 includes PEID 402, type 404, length 408, and a value field 428; and result 432 includes flags 410, EID 412, bitmap 414, and RID 416). The entry represented by data structure 420 contains the value 428 field for, e.g., a string with a length between 10 and 21 bytes. Data structure 420 has a row length of 38 bytes, which includes 28 bytes for hash key 430 and 10 bytes for result 432.

Figure 4C:
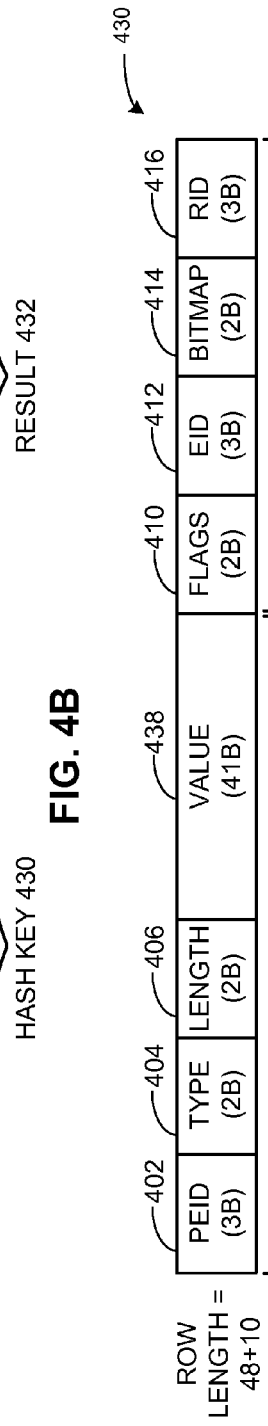
FIG. 4C presents a table depicting a format of a hash table data structure with keys that include a value with a size up to 41 bytes, in accordance with an embodiment of the present invention.

FIG. 4C presents a table depicting a format of a hash table data structure 430 with keys that include a value with a size up to 41 bytes, in accordance with an embodiment of the present invention. Data structure 430 includes fields similar to data structure 400 (e.g., hash key 440 includes PEID 402, type 404, length 408, and a value field 438; and result 432 includes flags 410, EID 412, bitmap 414, and RID 416). The entry represented by data structure 430 contains value 428 for, e.g., a string with a length between 22 and 41 bytes. Data structure 430 has a row length of 58 bytes, which includes 48 bytes for hash key 440 and 10 bytes for result 442.

Figure 4D:
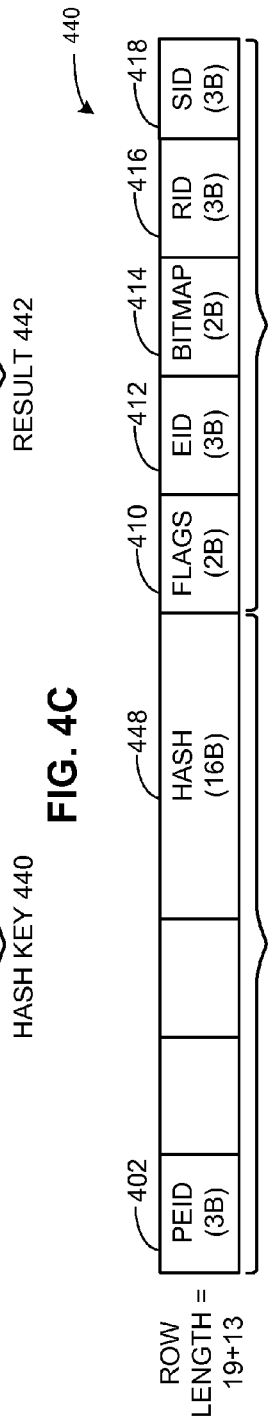
FIG. 4D presents a table depicting a format of a hash table data structure with keys that include a hash value for a string with a size greater than 41 bytes, in accordance with an embodiment of the present invention.

FIG. 4D presents a table depicting a format of a hash table data structure with keys that include a hash value for a string with a size greater than 41 bytes, in accordance with an embodiment of the present invention. Data structure 430 includes a hash key 450 and a result 452. Hash key 450 includes PEID 402 and a 16-byte hash value 448, which contains the compressed key as described above in relation to FIGS. 2 and 3A. Result 452 includes fields similar to data structure 400 (e.g., flags 410, EID 412, bitmap 414, and RID 416) and further includes a string identifier (SID) field 418 which contains a pointer to a table that stores the value of the uncompressed key. In some embodiments, the SID is a collision identifier (CID) indicated by a bit in flags 410. Data structure 440 has a row length of 32, which includes 19 bytes for hash key 450 and 13 bytes for result 452.

In some embodiments (e.g., the NP4), entries in a hardware-assisted hash table are limited to: 36 bytes per entry, where the key and result together are less than or equal to 32 bytes; and 68 bytes per entry, where the key and result together are less than or equal to 64 bytes. Data structures 400, 420, 430, and 440 meet these limits. Data structure 400 represents an entry in the forwarding hash table where the value of the key (e.g., name component) is 9 bytes, and data structures 420 and 430 represent entries with values for larger strings (21 and 41 bytes, respectively). Data structure 440 represents an entry with a key of a length longer than 41 bytes, where the network processor uses a compressor or hash function to obtain a compressed key (hash 448) of 16 bytes in length. Thus, data structures 400 and 440 (26 and 32 bytes, respectively) will both fit in 32 bytes, while data structures 420 and 430 (38 and 58 bytes, respectively) will result in 64-byte entries. Note that because data structure 420 results in the same amount of memory and the same number of cycles as the larger entry of data structure 430, in some embodiments, the system may not use data structure 420. In addition, the data structures for uncompressed keys (e.g., data structures 400, 420, and 430) can include length-encoded name components. For example, data structure 400 has a TLV that includes type field 404, length field 406, and value field 408. Hence, when a literal name component is used as part of the key (e.g., "PEID+name component" in an uncompressed key), the system can accurately determine the value because the remainder of the 41 bytes will be zero padded.

Exemplary Forwarding Hash Table and Corresponding Use Case

Figure 5:
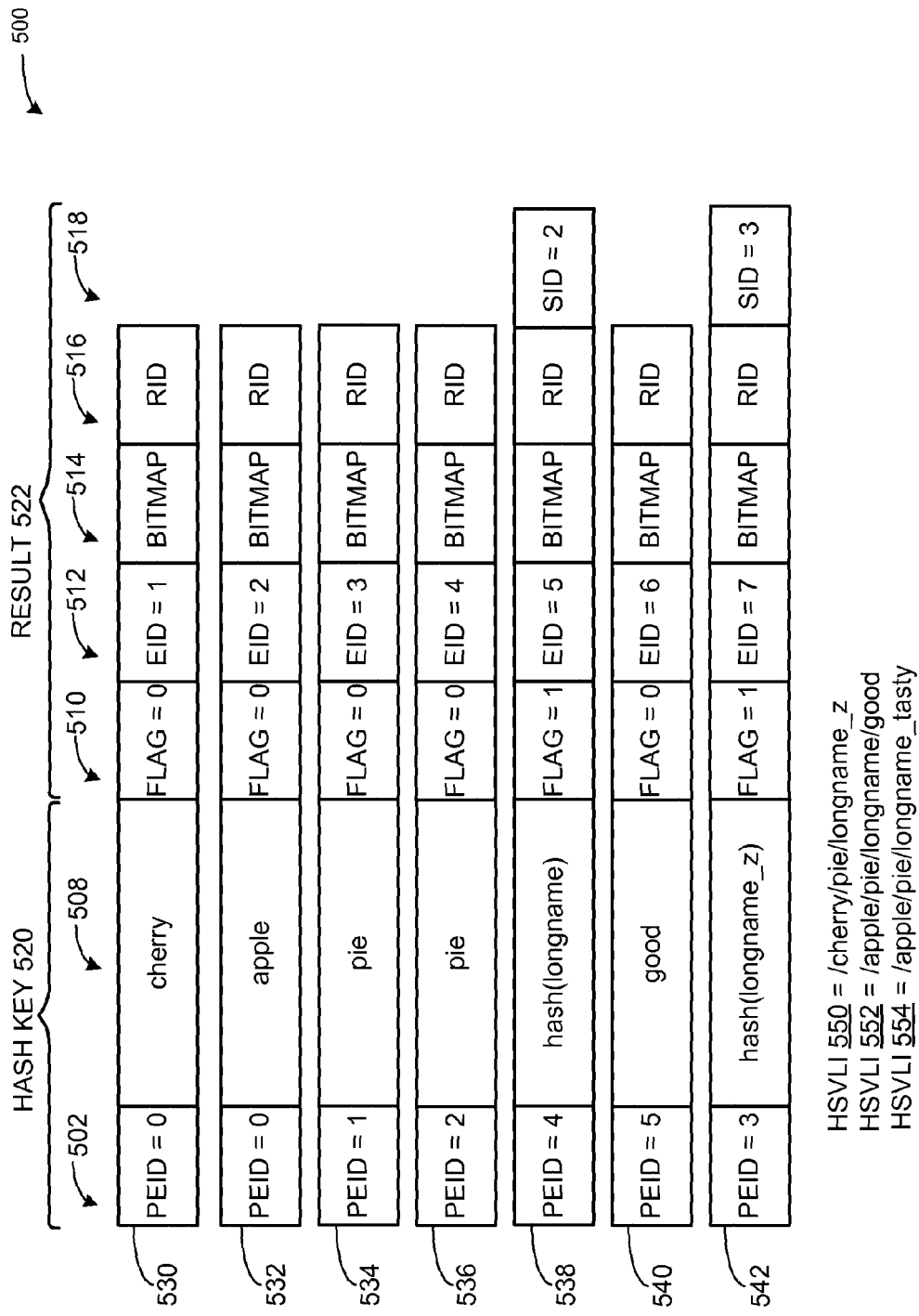
FIG. 5 presents a table depicting an exemplary forwarding hash table, in accordance with an embodiment of the present invention.

FIG. 5 presents a table depicting an exemplary forwarding hash table 500, in accordance with an embodiment of the present invention. Forwarding hash table 500 includes entries 530, 532, 534, 536, and 540 that correspond to data structure 400 (e.g., a key for a string of a length less than or equal to 41 bytes). Forwarding hash table 500 also includes entries 538 and 542 that correspond to data structure 440 (e.g., a compressed key for a string of a length greater than 41 bytes). Each entry in forwarding hash table 500 includes a hash key 520 and a result 522. Hash key 520 includes a PEID 502 and a value 508, and result 522 includes a flag 510, an EID 512, a slot bitmap 514, an RID 516, and (for some entries) an SID 518.

Figure 6:
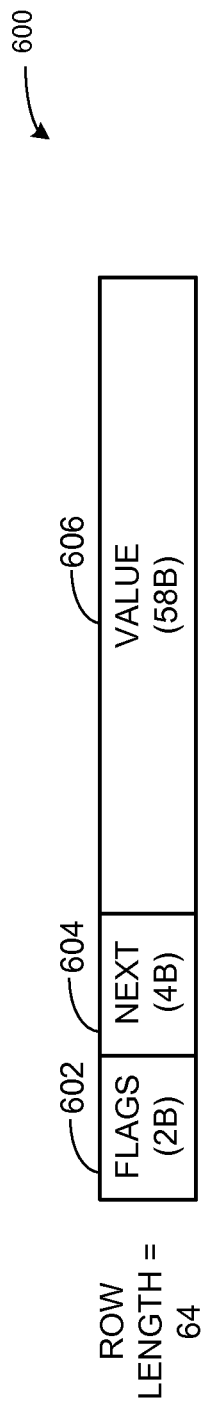
FIG. 6 presents a table depicting a format of a string table, in accordance with an embodiment of the present invention.
Figure 7:
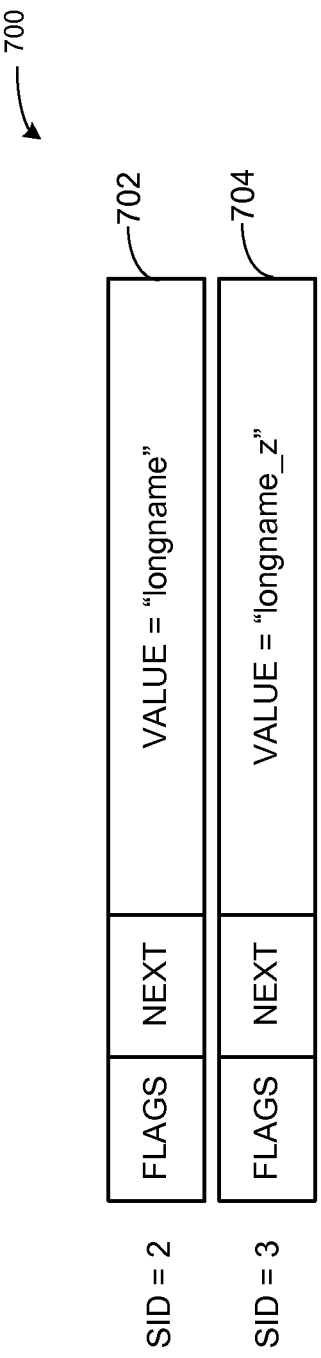
FIG. 7 presents a table depicting an exemplary string table, in accordance with an embodiment of the present invention.

FIG. 6 presents a table depicting a format of a string table 600, in accordance with an embodiment of the present invention. String table 600 can include a 2-byte flags field 602, a 4-byte next field 604, and a 58-byte value field 606. Flags 602 can be specific to, e.g., the NP4 processor. Next 604 can be a pointer for a string that takes multiple entries. If a string requires multiple entries, flags 602 can indicate the table in which to perform the next lookup. For example, storing a 64-byte string can use two string table entries. Value 606 can be a length-encoded string. FIG. 7 presents a table depicting an exemplary string table 700, in accordance with an embodiment of the present invention. String table 700 can include an entry 702 with an SID of "2" and a value of "longname" and an entry 704 with an SID of "3" and a value of "longname_z."

The following use case for HSVLI 552 is based on the exemplary tables presented and described in relation to FIGS. 4A-D, 5, 6, and 7, and the methods disclosed herein. During operation, a CCN forwarder or router can receive an interest with an HSVLI 552 of "/apple/pie/longname/good." The system finds the longest prefix match by looking up a first forwarding entry based on a hash key with a PEID of "0" concatenated with the short (e.g., less than or equal to 41 bytes) string "apple" of the most general level name component. The forwarding hash table returns a result with an EID of "2" (entry 532), which the system then uses as the PEID to lookup the next forwarding entry. The system looks up the next forwarding entry based on a hash key with a PEID of "2" concatenated with the short string "pie" of the next most general level name component, which returns a result with an EID of "4" (entry 536). Next, the system looks up the next forwarding entry based on a hash key with a PEID of "4" concatenated with the hash value of the long (e.g., greater than 41 bytes) string "longname," which returns a result with a collision flag set to "1" that indicates a collision, as well as an SID with a value of "2" (entry 538). The system can determine that the collision is due to two hash keys resulting in the same forwarding entry (e.g., hashing to the same bucket). The system can perform a new hash function on the uncompressed key to obtain a new hash key, use that new hash key to obtain the forwarding entry result in a separate collision table, and return that value to as the result for entry 538. In another example, a lookup on an HSVLI 550 of "/cherry/pie/longname_z" would result in a chained hash lookup (based on PEIDs chained to previous EIDs) resulting in entry 530, entry 534, and entry 542. Upon determining that a collision flag in entry 542 is set to "1" (indicating that the hash of the name component "longname_z" from HSVLI 550 is the same as the hash of the name component "longname" from HSVLI 552), the system performs the new hash function as described above to obtain a new hash key and uses the new hash key to obtain the appropriate forwarding entry result from the separate collision table.

Additionally, the system can determine that the collision occurs because a name component of the HSVLI does not exist in the forwarding hash table, but its hash collides with an existing entry. The system can use the SID of entry 538 to obtain the uncompressed key stored in a separate string table, compare the obtained string with the name component of the HSVLI in the packet memory, and proceed accordingly. As discussed above, this comparison can yield a Boolean result which indicates whether or not the string from the packet memory exists in the string table (and hence is the correct entry in the forwarding hash table). For example, a lookup on an HSVLI 554 of "apple/pie/longname_tasty" yields a chained hash lookup resulting in entry 532 and entry 536. If the hash of the long string "longname_tasty" of HSVLI 554 results in the same value as the hash of the name component "longname" of HSVLI 552, but the forwarding hash table does not contain an entry for "longname_tasty," this collision cannot be detected during the insertion process. In this case, the next lookup yields entry 538 and the system determines correctness by retrieving the string indicated by SID=2 in result 538 and performing a string comparison between the retrieved string (e.g., "longname") and the string of the name component from HSVLI 554 from the packet memory (e.g., "longname_tasty"). The system determines that the two strings are not equal, indicating that even if entry 538 is returned as a match, it is an incorrect match. Subsequently, the system can return the previous match forwarding entry as the longest prefix match for HSVLI 554 (e.g., entry 536).

Returning to HSVLI 552, the system determines after the collision resolution and correctness checks that entry 538 contains the result for the correct forwarding entry (based on a hash key of "4" concatenated with the hash value of the string "longname"). Entry 538 contains an EID of "5," which the system uses as the PEID for the next lookup, which has a hash key with a PEID of "5" concatenated with the short string "good." This lookup yields a result with an EID of "6", a slot bitmap, and an RID. Because there are no further name components to be processed in HSVLI 552, the forwarding entry for entry 540 contains the longest prefix match and is used by the CCN router to forward the packet.

Exemplary Computer and Communication System

Figure 8:
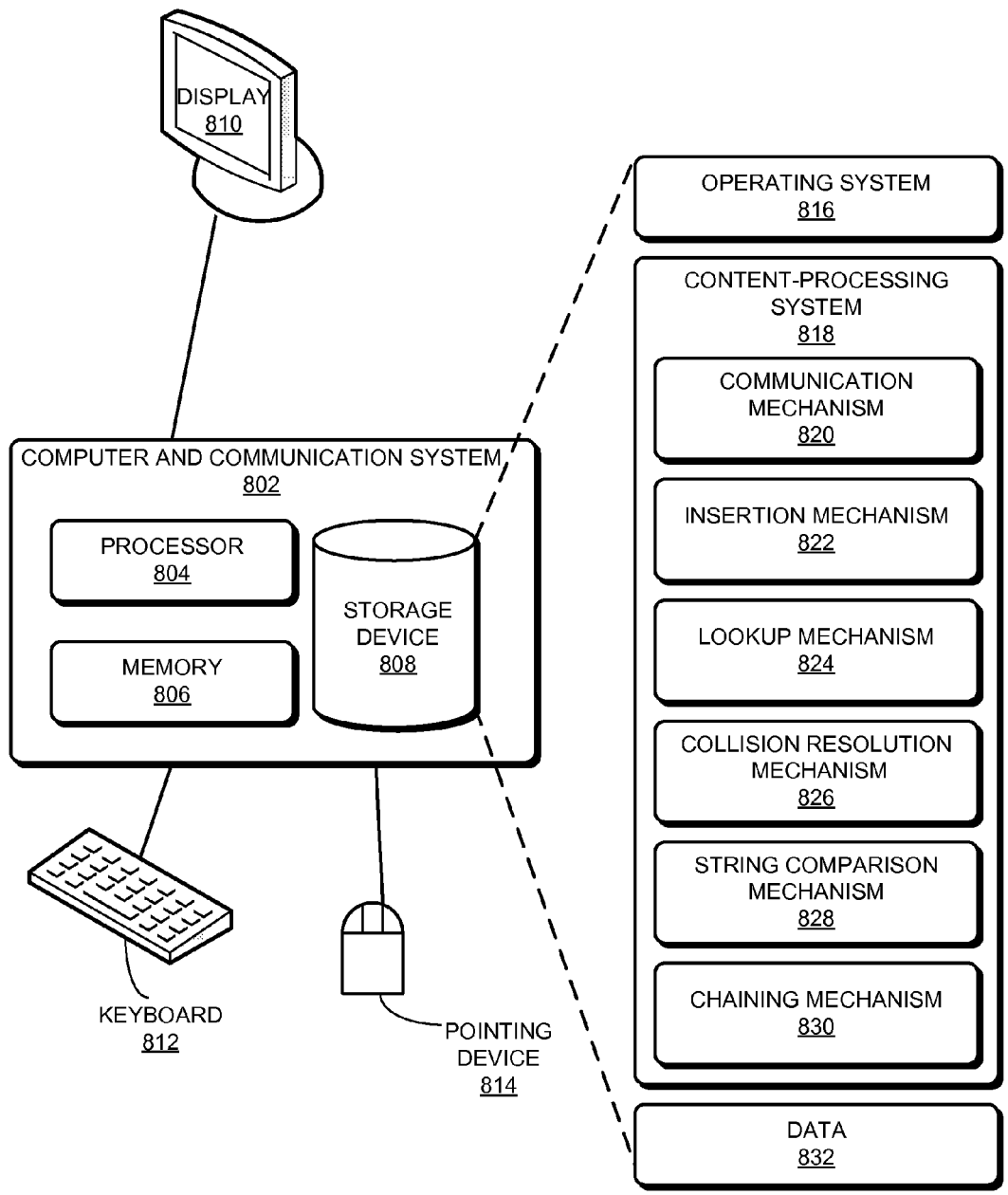
FIG. 8 illustrates an exemplary computer and communication system that facilitates forwarding of packets with variable length names based on hardware-assisted hash tables, in accordance with an embodiment of the present invention In the figures, like reference numerals refer to the same figure elements.

FIG. 8 illustrates an exemplary computer and communication system 802 that facilitates forwarding of packets with variable length names based on hardware-assisted hash tables, in accordance with an embodiment of the present invention. Computer and communication system 802 includes a processor 804, a memory 806, and a storage device 808. Memory 806 can include a volatile memory (e.g., RAM) that serves as a managed memory, and can be used to store one or more memory pools. Furthermore, computer and communication system 802 can be coupled to a display device 810, a keyboard 812, and a pointing device 814. Storage device 808 can store an operating system 816, a content-processing system 818, and data 832.

Content-processing system 818 can include instructions, which when executed by computer and communication system 802, can cause computer and communication system 802 to perform methods and/or processes described in this disclosure. Specifically, content-processing system 818 may include instructions for sending or receiving a packet with an HSVLI over a computer network (communication mechanism 820). Content-processing system 818 can also include instructions for performing a longest prefix match lookup in a forwarding hash table (lookup mechanism 824). Content-processing system 818 can include instructions for inserting entries into a forwarding hash table (insertion mechanism 822). Content-processing system 818 can include instructions for, in response to determining a collision upon an insertion or a lookup in the forwarding hash table, resolving the lookup collision (collision resolution mechanism 826).

Content-processing system 818 can additionally include instructions for comparing an entry in a string table to a name component in packet memory (string comparison mechanism 828). Content-processing system 818 can include instructions for assigning unique entry identifiers to chain one entry to another entry (chaining mechanism 830).

Data 832 can include any data that is required as input or that is generated as output by the methods and/or processes described in this disclosure. Specifically, data 832 can store at least: a packet with an HSVLI; a forwarding hash table, a string table, and a separate collision table as described in this disclosure; and a parent identifier (PEID) and a unique entry identifier (EID) for each entry in the forwarding hash table.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for forwarding packets, comprising:
   receiving, by a computer, a packet with a hierarchically structured variable length identifier (HSVLI) which comprises contiguous name components ordered from a most general level to a most specific level; and
   performing a longest prefix match lookup for forwarding the packet by selecting an entry from a first data structure of entries, wherein a respective entry indicates a name component, forwarding information for the name component, and a plurality of entry identifiers that chain the respective entry to another entry, wherein performing the longest prefix match lookup further comprises:
   determining a size of a name component;
   if the size of the name component is less than or equal to a predetermined threshold, selecting a first entry based on the name component;
   if the size of the name component is greater than the predetermined threshold:
   compressing the name component to obtain a compressed key;
   selecting a second entry based on the compressed key; and
   in response to determining a lookup collision associated with the selected second entry, wherein the lookup collision indicates that the compressed key and another compressed key both return a same entry when performing the lookup in the first data structure of entries, resolving the lookup collision based on a new lookup key, thereby facilitating forwarding of packets with variable length names.

2. The method of claim 1,
   wherein if the size of the name component is less than or equal to the predetermined threshold, the method further comprises creating the first entry in the first data structure based on the name component; and
   wherein if the size of the name component is greater than the predetermined threshold, the method further comprises:
   performing a first compression function on the name component to obtain the compressed key;
   creating the second entry in the first data structure based on the compressed key; and
   in response to determining an insertion collision based on the created second entry, wherein the insertion collision indicates that the compressed key and another compressed key both return a same entry when creating the second entry in the first data structure of entries, resolving the insertion collision based on the new lookup key.

3. The method of claim 2, wherein if the size of the name component is greater than the predetermined threshold, the method further comprises:
   creating a third entry in a second data structure based on the name component, wherein the second data structure indicates the name component and a corresponding index; and setting a string identifier in the created second entry for the name component in the first data structure to the corresponding index for the created third entry in the second data structure.

4. The method of claim 2, wherein resolving the insertion collision further comprises:
including a collision indicator in the created second entry in the first data structure;
performing a second compression function on the name component to obtain the new lookup key; and
creating a fourth entry in a third data structure based on the new lookup key, wherein the third data structure indicates the new lookup key and forwarding information for the name component.

5. The method of claim 4, wherein resolving the lookup collision further comprises:
determining that the selected second entry includes the collision indicator;
performing the second compression function on the name component to obtain the new lookup key; and
selecting a fifth entry in the third data structure based on the new lookup key.

6. The method of claim 3, further comprising:
in response to selecting the second entry in the first data structure based on the compressed key, determining a string identifier for the selected second entry;
retrieving, from the second data structure, the name component based on the determined string identifier; and
comparing the name component of the HSVLI with the retrieved name component from the second data structure.

7. The method of claim 1, wherein the plurality of entry identifiers includes a parent identifier and an entry identifier, wherein the entry identifier is unique for each entry in the first data structure, and wherein selecting the entry further comprises:
for each name component, beginning with a name component at the most general level, selecting the entry from the first data structure of entries based on the parent identifier, wherein:
for the most general level name component, the parent identifier of the selected entry corresponds to a predetermined initial value; and
for each subsequent name component, the parent identifier of the selected entry corresponds to the entry identifier of an entry corresponding to the name component of a previous most general level.

8. The method of claim 1, wherein the first data structure is a hash table of entries comprised of a key and a result, wherein:
if the size is less than or equal to the predetermined threshold, the key is based on the name component directly; and
if the size is greater than the predetermined threshold, the key is based on the compressed key.

9. A non-transitory computer-readable storage medium storing instructions that when executed by a computer cause the computer to perform a method for forwarding packets, the method comprising:
receiving, by the computer, a packet with a hierarchically structured variable length identifier (HSVLI) which comprises contiguous name components ordered from a most general level to a most specific level; and
performing a longest prefix match lookup for forwarding the packet by selecting an entry from a first data structure of entries, wherein a respective entry indicates a name component, forwarding information for the name component, and a plurality of entry identifiers that chain the respective entry to another entry, wherein performing the longest prefix match lookup further comprises:
determining a size of a name component;
if the size of the name component is less than or equal to a predetermined threshold, selecting a first entry based on the name component;
if the size of the name component is greater than the predetermined threshold:
compressing the name component to obtain a compressed key;
selecting a second entry based on the compressed key; and
in response to determining a lookup collision associated with the selected second entry, wherein the lookup collision indicates that the compressed key and another compressed key both return a same entry when performing the lookup in the first data structure of entries, resolving the lookup collision based on a new lookup key, thereby facilitating forwarding of packets with variable length names.

10. The storage medium of claim 9,
wherein if the size of the name component is less than or equal to the predetermined threshold, the method further comprises creating the first entry in the first data structure based on the name component; and
wherein if the size of the name component is greater than the predetermined threshold, the method further comprises:
performing a first compression function on the name component to obtain the compressed key;
creating the second entry in the first data structure based on the compressed key; and
in response to determining an insertion collision based on the created second entry, wherein the insertion collision indicates that the compressed key and another compressed key both return a same entry when creating the second entry in the first data structure of entries, resolving the insertion collision based on the new lookup key.

11. The storage medium of claim 10, wherein if the size of the name component is greater than the predetermined threshold, the method further comprises:
creating a third entry in a second data structure based on the name component, wherein the second data structure indicates the name component and a corresponding index; and
setting a string identifier in the created second entry for the name component in the first data structure to the corresponding index for the created third entry in the second data structure.

12. The storage medium of claim 10, wherein resolving the insertion collision further comprises:
including a collision indicator in the created second entry in the first data structure;
performing a second compression function on the name component to obtain the new lookup key; and
creating a fourth entry in a third data structure based on the new lookup key, wherein the third data structure indicates the new lookup key and forwarding information for the name component.

13. The storage medium of claim 12, wherein resolving the lookup collision further comprises:
determining that the selected second entry includes the collision indicator;

performing the second compression function on the name component to obtain the new lookup key; and
selecting a fifth entry in the third data structure based on the new lookup key.

14. The storage medium of claim 11, wherein the method further comprises:
in response to selecting the second entry in the first data structure based on the compressed key, determining a string identifier for the selected second entry;
retrieving, from the second data structure, the name component based on the determined string identifier; and
comparing the name component of the HSVLI with the retrieved name component from the second data structure.

15. The storage medium of claim 9, wherein the plurality of entry identifiers includes a parent identifier and an entry identifier, wherein the entry identifier is unique for each entry in the first data structure, and wherein selecting the entry further comprises:
for each name component, beginning with a name component at the most general level, selecting the entry from the first data structure of entries based on the parent identifier, wherein:
for the most general level name component, the parent identifier of the selected entry corresponds to a predetermined initial value; and
for each subsequent name component, the parent identifier of the selected entry corresponds to the entry identifier of an entry corresponding to the name component of a previous most general level.

16. The storage medium of claim 9, wherein the first data structure is a hash table of entries comprised of a key and a result, wherein:
if the size is less than or equal to the predetermined threshold, the key is based on the name component directly; and
if the size is greater than the predetermined threshold, the key is based on the compressed key.

17. A computer system for forwarding content, the system comprising:
a processor;
a storage device coupled to the processor and storing instructions that when executed by a computer cause the computer to perform a method, the method comprising:
receiving, by the computer, a packet with a hierarchically structured variable length identifier (HSVLI) which comprises contiguous name components ordered from a most general level to a most specific level; and
performing a longest prefix match lookup for forwarding the packet by selecting an entry from a first data structure of entries, wherein a respective entry indicates a name component, forwarding information for the name component, and a plurality of entry identifiers that chain the respective entry to another entry, wherein performing the longest prefix match lookup further comprises:
determining a size of a name component;
if the size of the name component is less than or equal to a predetermined threshold, selecting a first entry based on the name component;
if the size of the name component is greater than the predetermined threshold:
compressing the name component to obtain a compressed key;
selecting a second entry based on the compressed key; and
in response to determining a lookup collision associated with the selected second entry, wherein the lookup collision indicates that the compressed key and another compressed key both return a same entry when performing the lookup in the first data structure of entries, resolving the lookup collision based on a new lookup key, thereby facilitating forwarding of packets with variable length names.

18. The computer system of claim 17,
wherein if the size of the name component is less than or equal to the predetermined threshold, the method further comprises creating the first entry in the first data structure based on the name component; and
wherein if the size of the name component is greater than the predetermined threshold, the method further comprises:
performing a first compression function on the name component to obtain the compressed key;
creating the second entry in the first data structure based on the compressed key; and
in response to determining an insertion collision based on the created second entry, wherein the insertion collision indicates that the compressed key and another compressed key both return a same entry when creating the second entry in the first data structure of entries, resolving the insertion collision based on the new lookup key.

19. The computer system of claim 18, wherein if the size of the name component is greater than the predetermined threshold, the method further comprises:
creating a third entry in a second data structure based on the name component, wherein the second data structure indicates the name component and a corresponding index; and
setting a string identifier in the created second entry for the name component in the first data structure to the corresponding index for the created third entry in the second data structure.

20. The computer system of claim 18, wherein resolving the insertion collision further comprises:
including a collision indicator in the created second entry in the first data structure;
performing a second compression function on the name component to obtain the new lookup key; and
creating a fourth entry in a third data structure based on the new lookup key, wherein the third data structure indicates the new lookup key and forwarding information for the name component.

21. The computer system of claim 20, wherein resolving the lookup collision further comprises:
determining that the selected second entry includes the collision indicator;
performing the second compression function on the name component to obtain the new lookup key; and
selecting a fifth entry in the third data structure based on the new lookup key.

22. The computer system of claim 19, wherein the method further comprises:
in response to selecting the second entry in the first data structure based on the compressed key, determining a string identifier for the selected second entry;
retrieving, from the second data structure, the name component based on the determined string identifier; and comparing the name component of the HSVLI with the retrieved name component from the second data structure.

23. The computer system of claim 17, wherein the plurality of entry identifiers includes a parent identifier and an entry identifier, wherein the entry identifier is unique for each entry in the first data structure, and wherein selecting the entry further comprises:

for each name component, beginning with a name component at the most general level, selecting the entry from the first data structure of entries based on the parent identifier, wherein:

for the most general level name component, the parent identifier of the selected entry corresponds to a predetermined initial value; and for each subsequent name component, the parent identifier of the selected entry corresponds to the entry identifier of an entry corresponding to the name component of a previous most general level.

24. The computer system of claim 17, wherein the first data structure is a hash table of entries comprised of a key and a result, wherein:

if the size is less than or equal to the predetermined threshold, the key is based on the name component directly; and if the size is greater than the predetermined threshold, the key is based on the compressed key.

* * * * *